(12) United States Patent  
Hayward

(10) Patent No.: US 8,656,941 B1
(45) Date of Patent: Feb. 25, 2014

(54) FLOW CONTROL VALVE

(75) Inventor: David G. Hayward, Scottsdale, AZ (US)

(73) Assignee: Jansen's Aircraft System Controls, Inc., Tempe, AZ (US)

( * ) Notice: Subject to any disclaimer, the term of this patent is extended or adjusted under 35 U.S.C. 154(b) by 331 days.

(21) Appl. No.: 12/987,764

(22) Filed: Jan. 10, 2011

Related U.S. Application Data

(60) Provisional application No. 61/293,755, filed on Jan. 11, 2010.

(51) Int. Cl.
 *F16K 1/12* (2006.01)
 *F16K 11/044* (2006.01)

(52) U.S. Cl.
 USPC ...................................... 137/221; 137/625.68

(58) Field of Classification Search
 USPC ............ 137/219, 221, 625.68; 251/25, 30.01, 251/30.02
 See application file for complete search history.

(56) References Cited

U.S. PATENT DOCUMENTS

| | | | | |
|---|---|---|---|---|
| 2,439,523 A | * | 4/1948 | Miller et al. ................ | 251/30.02 |
| 2,679,856 A | * | 6/1954 | Gerritsen et al. ............. | 137/221 |
| 2,919,714 A | * | 1/1960 | Mrazek ......................... | 137/220 |
| 3,099,285 A | * | 7/1963 | Berg et al. ..................... | 137/220 |
| 3,172,420 A | * | 3/1965 | Brown et al. ................. | 137/219 |
| 3,297,047 A | * | 1/1967 | Sime .............................. | 137/220 |
| 3,415,269 A | * | 12/1968 | Salerno ......................... | 137/219 |
| 3,792,716 A | * | 2/1974 | Sime et al. .................... | 137/492 |
| 4,026,327 A | * | 5/1977 | Deinlein-Kalb .............. | 137/630 |
| 4,826,104 A | | 5/1989 | Bennett et al. | |
| 6,390,129 B2 | | 5/2002 | Jansen et al. | |
| 6,742,539 B2 | * | 6/2004 | Lyons ........................... | 137/219 |
| 7,232,152 B2 | * | 6/2007 | Isakov et al. ................. | 280/736 |
| 7,255,132 B2 | * | 8/2007 | Edmond et al. .......... | 137/625.65 |
| 2010/0038565 A1 | | 2/2010 | Christensen et al. | |

\* cited by examiner

*Primary Examiner* — Craig Schneider
(74) *Attorney, Agent, or Firm* — Quarles & Brady LLP

(57) ABSTRACT

A fast acting flow control valve uses an electronically-actuated, short-stroke 3-way pilot poppet to actuate a primary poppet valve, for example, to provide impulse thrust to an air or space vehicle. The pilot poppet arrangement has an electromagnetic actuator for positioning the pilot poppet with respect to first and second seats. When the pilot poppet is sealed against the first seat a pressure passage communicates with seat openings and a vent passage of the valve is blocked from the seat openings. When the pilot poppet is sealed against the second seat the pressure passage is blocked from the seat openings and the vent passage communicates with the seat openings. The primary valve arrangement has a primary poppet that seals against a primary seat when the pilot poppet is sealed against the first seat and is unseated when the pilot poppet is sealed against the second seat.

20 Claims, 6 Drawing Sheets

FLOW CONTROL VALVE

CROSS-REFERENCE TO RELATED APPLICATION(S)

This application claims benefit to U.S. provisional application Ser. No. 61/293,755, filed Jan. 11, 2010.

STATEMENT OF FEDERALLY SPONSORED RESEARCH OR DEVELOPMENT

Not applicable.

BACKGROUND

1. Technical Field

The present disclosure relates to flow control, and in particular, to devices that operate very rapidly in high pressure environments. One example is a valve for controlling flow of a high-energy pressurant during impulse thrust of rocket or jet engines such as those used in high-speed air and space flight vehicles.

2. Discussion of the Art

Fast acting flow control valves are required for a variety of applications, including applications critical to the control of rocket or jet powered vehicles, missiles or other craft. Commonly, thrusters are used to control propulsion and attitude (e.g., pitch, yaw and roll) of such craft. The thrusters can also be used to reverse thrust to slow or aid in landing the craft. Typically, the thrusters receive high pressure gas from a solid or liquid propellant source. Depending on the specific application, the thrusters can operate for longer sustained durations or in very short bursts, or impulses, of a few seconds or less. Impulse thrusters, as they are called, are required to operate and shut-off nearly immediately upon demand, for example, so that precise flight control can be achieved or to provide instantaneous back-up thrust in the event of main thruster failure.

U.S. Patent Application Publication 2010/0038565 discloses a propellant gas control valve that couples to a thrust nozzle. This valve includes a pilot stage with a pilot flapper valve and actuator and a main stage with a main piston valve and actuator. The pilot and main stages interact via a control pressure port such that below a threshold pressure, associated with short duration flow commands, only the pilot valve is activated and above the threshold pressure, associated with long duration flow commands, both the pilot and main stage valves are activated. A small passage leads from the pilot stage to the outlet to provide low flow propellant pulses when the main stage is de-activated. However, when the main stage is activated, high-rate propellant can flow from the valve. The valve thus works in two modes to supply propellant for low to high thrust values, for example 2-20 lbf, with relatively fine impulse resolution (low minimum impulse bit) during low flow operation.

U.S. Pat. No. 4,826,104 discloses a thruster control valve having an electromagnetically controlled piston valve as the primary flow control valve. The valve can be mounted either at or remote from the combustion chamber of the rocket, and the actuator can be located at or remote from a valve controlling flow to the piston chamber. In the latter case, the disclosed valve has a poppet attached to an elongated plunger that is driven by a solenoid. The poppet has two seats that work to alternately close off supply or exhaust ports leading to/from the piston chamber. The normally de-energized solenoid positions the poppet to engage the exhaust seat so that supply pressure can seat the piston to close off the thrust nozzle. Energizing the solenoid moves the poppet into engagement with the supply seat, which first allows the piston chamber to vent and then allows the piston to unseat from the thrust nozzle so that pressure flow from the combustion chamber can pass through the thrust nozzle.

Still there remains a need for a control valve that provides better response to activation and deactivation command signals. The published application mentioned above is concerned with bi-modal operation to achieve a wide range of thrust values with fine resolution during low flow operation. However, this technique adversely affects the responsiveness of the valve because of the delays associated with the initial low flow stage. The '104 patent, on the other hand, discusses achieving faster operation times by mounting the valve in the combustion chamber, however acknowledges inherent electrical, mechanical and pneumatic delays in the remote actuator construction described above arising from pressurization and depressurization of the piston chamber and the "dead volume" of the actuator arrangement.

BRIEF SUMMARY

The disclosure relates to an electronically driven, pilot actuated flow control valve such as for providing on-demand impulse thrust to an air or space vehicle. The valve can combine pilot and primary poppet arrangements to rapidly open and close the valve in response to the drive command signal. The pilot poppet, which can act as a 3-way valve, can be pressure balanced and have an extremely short stroke to provide the speed and accuracy demanded by highly critical applications.

Specifically, in one aspect the valve can include a pilot poppet arrangement having an electromagnetic actuator for positioning the pilot poppet with respect to first and second seats. When the pilot poppet is sealed against the first seat a pressure passage of the valve can be in communication with openings of the first and second seats and a vent passage of the valve can be blocked from the first and second seat openings. When the pilot poppet is sealed against the second seat the pressure passage can be blocked from the first and second seat openings and the vent passage can be in communication with the first and second seat openings. The primary valve arrangement can have a primary poppet that seals against a primary seat when the pilot poppet is sealed against the first seat and is unseated when the pilot poppet is sealed against the second seat.

In another aspect the valve can include a first seat spaced from a second seat along an axis. Each of the first and second seats can have an opening therethrough. The pilot poppet can be disposed between the first and second seats so that it is movable along the axis. The pilot poppet has first and second sealing surfaces which alternatively seal against the respective first and second seats. The primary poppet can have a sealing surface that is movable to seal against a primary seat. The primary poppet can seal against the primary seat when the pilot poppet is sealed against the first seat and the primary poppet can unseat when the pilot poppet is sealed against the second seat. A pressure passage between the first and second seats can be configured to communicate an inlet of the valve with the first and second seat openings when the pilot poppet is sealed against the first seat and block it from the first and second seat openings when the pilot poppet is sealed against the second seat. A vent passage between the first and second seats can be configured to communicate a low pressure area with the first and second seat openings when the pilot poppet is sealed against the second seat and block it from the first and second seat openings when the pilot poppet is sealed against the first seat.

In still another aspect the invention provides a rapid-response impulse thrust valve. The valve can have a pilot valve arrangement with an electromagnetic actuator for positioning a pilot poppet with respect to spaced apart first and second seats. When the pilot poppet is sealed against the first seat a pressure passage of the valve can be in communication with openings of the first and second seats and a vent passage of the valve can be blocked from the first and second seat openings. When the pilot poppet is sealed against the second seat the pressure passage can be blocked from the first and second seat openings and the vent passage can be in communication with the first and second seat openings. The impulse valve can also have a primary valve arrangement with a primary poppet which seals against a primary seat. The primary poppet can seal against the primary seat when the pilot poppet is sealed against the first seat and unseat when the pilot poppet is sealed against the second seat.

The valve can further include a poppet seal spaced axially between the first and second seats for sealing with an outer surface of the pilot poppet between the first and second sealing surfaces. The poppet seal seals the vent passage from the pressure passage when the pilot poppet is unseated from the first and second seats. The pilot poppet can have a very short stroke length, for example less than 0.005 inch. And the pilot poppet actuates very rapidly, for example having an open actuation time of less than 70 ms and a close actuation time of 12 ms.

The primary poppet can include a cup defining an enclosed internal volume in communication with the pressure passage when the pilot poppet is sealed against the first seat and in communication with the vent passage when the pilot poppet is sealed against the second seat. The primary poppet can also have a grooved flange containing one or more seal rings and a return spring disposed within the internal volume of the primary poppet. A volume compensator can also be disposed within the internal volume of the primary poppet.

The electronic actuator for moving the pilot poppet can include an electromagnet with a movable armature disposed with an armature cavity. The armature cavity can be in communication with the opening in the second seat such that the armature cavity is in communication with the pressure passage when the pilot poppet is sealed against the first seat and is in communication with the vent passage when the pilot poppet is sealed against the second seat. The armature can have at least one internal passage extending between its ends and can be directly connected to the pilot poppet via a suitable tongue and groove connection. A return spring disposed within the armature cavity can act to return the armature when the actuator is deactivated.

These and still other advantages will be apparent from the following detailed description of the drawings. To assess the full scope of the invention the claims should be looked to as the construction(s) shown in the drawings and described below are not limiting.

DETAILED DESCRIPTION OF THE DRAWINGS

Figure 1:
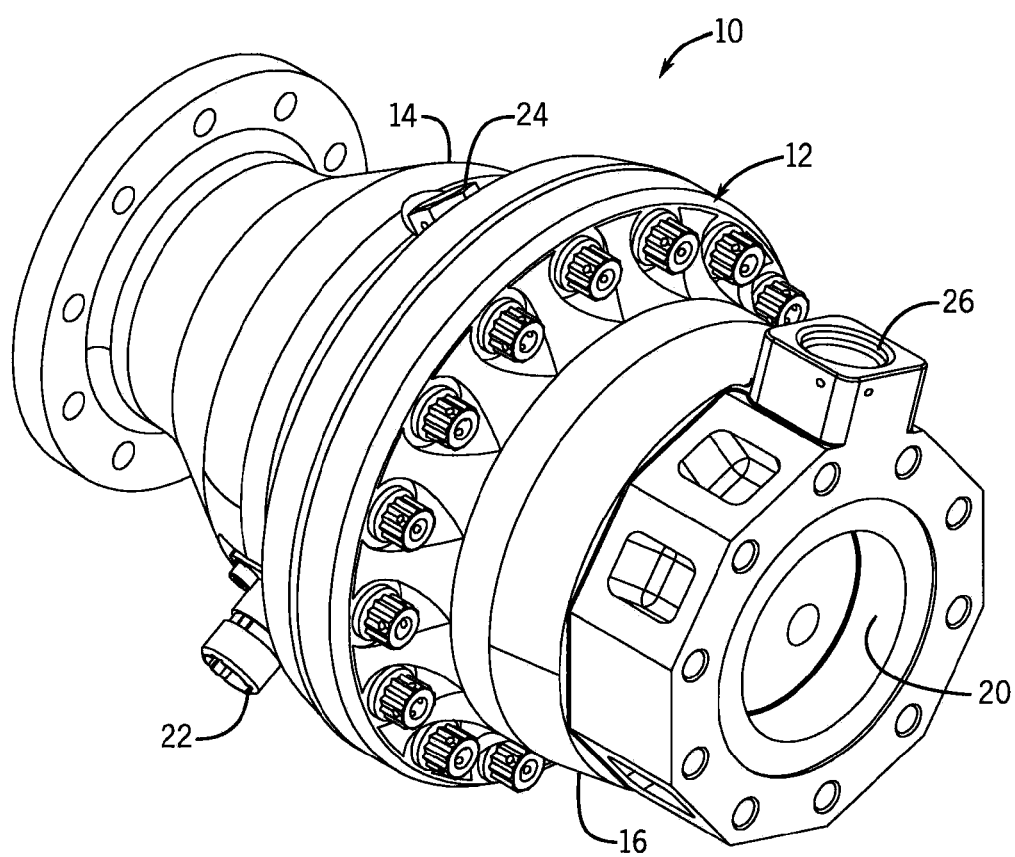
FIG. 1 is a perspective view of a flow control valve according to the present disclosure.

One exemplary construction of a flow control valve 10 is shown in the drawings. The flow control valve 10 can be used in a variety of applications. However, the exemplary construction has sufficient pressure-handling capabilities, accuracy, resolution and responsiveness suitable for use as a thrust control valve, and in particular an impulse thrust control valve. As such, the components of the flow control valve 10 will be described herein in the context of a thruster application. However, this should not limit the disclosed valve to any particular application.

As shown in FIGS. 1-3A, the valve 10 has an annular housing body 12 including an inlet housing 14 and an outlet housing 16. The inlet housing 14 has a flanged end which can bolt directly to the pressurant tank (not shown) so that an inlet opening 18 is in communication with pressurized media, in either a liquid or gaseous state. The opposite end of the inlet housing 14 has another flange which bolts to a flanged end of the outlet housing 16. The opposite end of the outlet housing 16 has an outlet opening 20 that can couple to a thrust nozzle (not shown). Electrical 22 and vent 24 fittings on the inlet housing 14 connect an electrical harness (not shown) and a line (not shown) to ambient air or a low pressure chamber, respectively, and an auxiliary fitting 26 can be provided on the outlet housing 16. The inlet housing 14 also has internal housing structure defining an internal solenoid cavity 28 and an internal face 30.

The internal face 30 of the inlet housing 14 separates a pilot poppet assembly 32 contained therein from a primary poppet assembly 34 contained in the outlet housing 16. For example, the pilot poppet assembly 32 can include an actuator solenoid 36 including a bobbin 38, a magnetically inert reluctor 40 and an armature pole piece 42 about which a coil 44 is wound. The bobbin 38 is bolted to the internal face 30 of the inlet housing 14. The bobbin assembly fits within a housing sleeve 46 which is enclosed by a coil retainer 48, a pole retainer 50 and a nose cap 52, which seals off the solenoid cavity 28 via seal 54. Within the center of the bobbin assembly is an armature 56 having a bore receiving an armature spring 58 that biases the armature 56 away from the pole piece 42. As is understood, energizing the coil 44 causes magnetic flux to pass through the metallic housing sleeve 46, coil retainer 48, pole piece 42, armature 56 and bobbin 38. The inert reluctor 40 prevents the magnetic flux lines from shorting between the pole piece 42 and the bobbin 38, but instead causes the magnetic flux to pass through the armature 56 so as to apply a magnetic force in a direction to move the armature 56 toward the pole piece 42.

The end of the armature 56 opposite the spring 58 connects to a pilot poppet 60. As can be seen well in FIG. 3B, the end of the armature 56 can have a slot 62 which receives an enlarged head 64 of the pilot poppet 60 in a bayonet type connection. The enlarged head 64 of the pilot poppet 60 is captured within the slot 62 securely so that the pilot poppet 60 moves with the armature 56 without relative axial movement. The pilot poppet 60 is disposed within a pilot poppet chamber 66 defined by the inlet housing structure forming the internal face 30. The pilot poppet 60 is also disposed through an opening 68 of a first seat piece 70 that is held against an inlet side surface of the internal face 30 and sealed by seal 72. A second seat piece 74, having opening 76, is mounted at the outlet side of the internal face 30 by a retainer 78 that can be bolted to the internal face 30. The pilot poppet 60 can have an annular body that has annular sealing surfaces 80 and 82, which alternately engage the first 70 and second 74 seat pieces, respectively.

Figure 2:
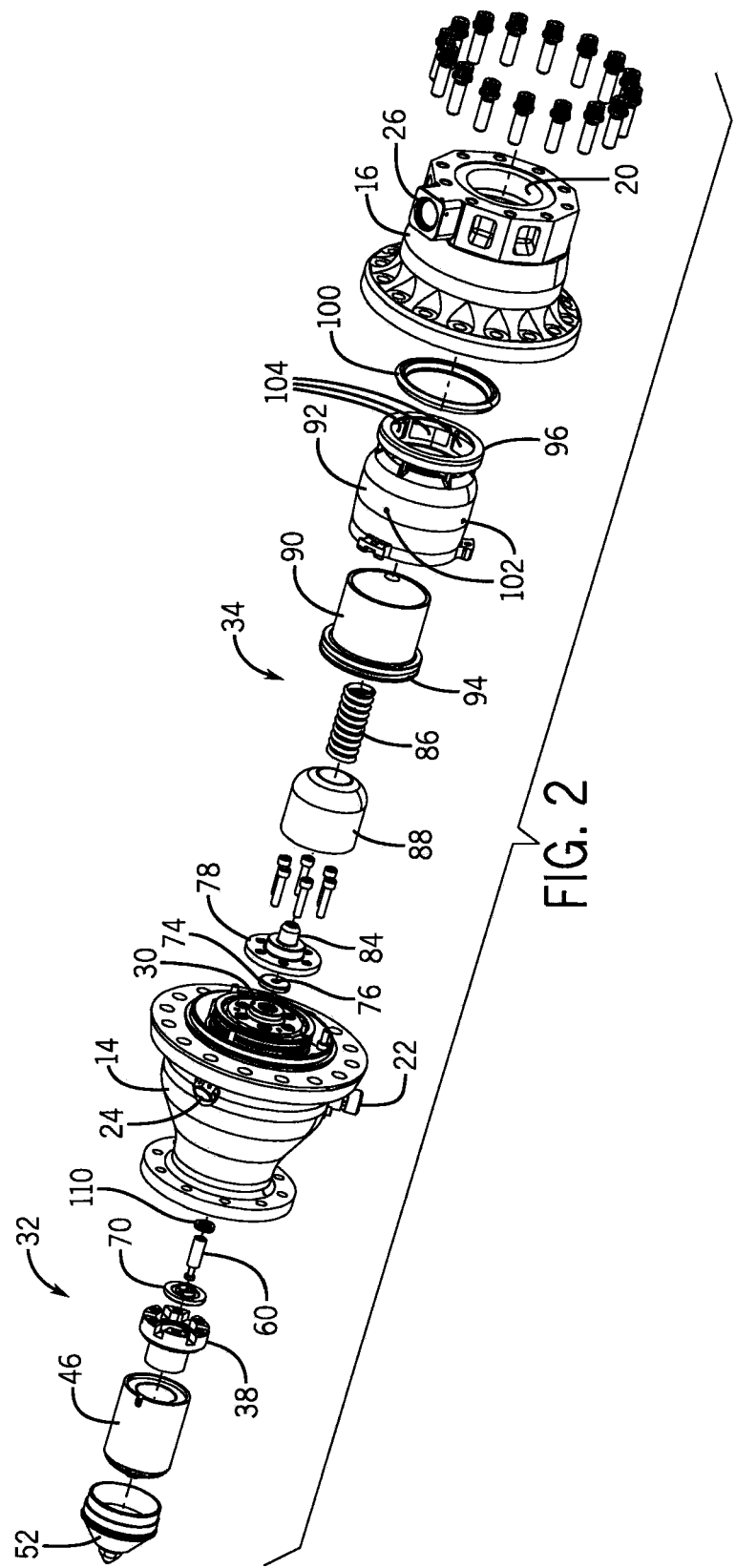
FIG. 2 is an exploded assembly view thereof.

The retainer 78 can have a spring guide 84 with an opening therethrough about which a poppet spring 86 fits. The poppet spring 86 sits inside a bore of a volume compensator 88 which is held against the retainer 78 by the poppet spring 86. The volume compensator 88 is disposed within a cup-shaped primary poppet 90 that moves within a poppet guide 92. The primary poppet 90 mounts seals 94 which create a sliding seal with an inner bore of the poppet guide 92. A metering edge 96 of the primary poppet 90 interacts with a primary seat 98 of the outlet housing 16. The poppet guide 92 is sealed against the outlet housing 16 via seal 100. The poppet guide 92 can have bleed holes 102 and flow windows 104, as shown in FIG. 2.

The pressurant coming through the inlet opening 18 passes through the flow control valve 10 toward the outlet opening 20 through one or more main passages 106 (one shown). The flow through the main passages 106 is prevented from reaching the outlet opening 20 when the primary poppet 90 is in the FIG. 3A position, which is the normal state of the flow control valve 10 in which the solenoid 36 is de-energized. One or more small passages 108 (one shown) run between the main passages 106 and the solenoid cavity 28, in particular to an upstream side of the first seat piece 70, which is sealed from the downstream side of the second seat piece 74 by a seal 110 that slidably seals against the outside of the pilot poppet 60. The passages 108 thus communicate pressure from the main passages 106 through the opening 68 in the first seat piece 70 and into the solenoid cavity 28 within the space between the bobbin 38 and the armature 56. One or more passages 112 (one shown) through the armature 56 communicate pressure to the open-ended bore containing the armature spring 58. The pressure accumulated within the bobbin 38 is less than the spring force of the armature spring 58 to maintain the armature 56 in the FIG. 3A position.

Pressure from the passages 108 is also transferred into the interior cavity of the primary poppet 90 via one or more passages 114 leading into a hollow center 116 of the pilot poppet 60 through the opening 76 in the second seat piece 74, the retainer 78 and the bore of the volume compensator 88. The primary poppet 90 is pressurized to supplement the spring force of the poppet spring 86 that seats the metering edge 96 of the primary poppet 90 against the primary seat 98. The internal spaces of both the solenoid 36 and the primary poppet 90 are pressurized in the normal state of FIG. 3A. The pilot poppet 60 realizes the same pressure at both ends and is thus pressure-balanced so that minimal force is required for actuation of the pilot poppet 60. Such pressure-balancing also permits the time for opening and closing the primary poppet 90 to be essentially independent of the inlet pressure, such that the open and close speeds can be maintained essentially constant over a range of pressures. Furthermore, pressurization can be maintained while simultaneously establishing a vacuum area in the pilot poppet chamber 66 between the second seat piece 74 and the seal 110.

Once a command signal is received to energize the solenoid 36, the magnetic flux generated by the coil 44 forces the armature 56 toward the pole piece 42, which thus moves the pilot poppet 60 to unseat from the second seat piece 74. Since the pilot poppet chamber 66 is already at low pressure due to one or more passages 118 (one shown) being in communication with the ambient/low pressure fitting 24, venting of the spaces internal to the primary poppet 90 and the bobbin 38 begins almost immediately. In addition to the rapid venting of the previously pressurized internal spaces, the stroke length of the pilot poppet 60 is extremely short, especially relative to the stroke length of the primary poppet 90. Because of the very short stroke traveled by the pilot poppet 60 for its sealing surface 80 to engage the first seat piece 70, the pressure flow through passages 108 is closed off promptly, thereby allowing very rapid movement of the armature 56 toward the pole piece 42 and the primary poppet 90 to be opened by the force of the poppet spring 86. With the primary poppet 90 now in the FIG. 4A position with the metering edge 96 unseated from the primary seat 98, as well shown in FIG. 4B, flow is permitted to the outlet opening 20 through the windows 104 in the poppet guide 92, and to a thrust nozzle (not shown) in the exemplary thruster application. De-energizing the solenoid 36 allows the armature spring 58 to drive the armature 56 away from the pole piece 42 within the now evacuated bobbin 38 to move the pilot poppet 60 through its short stroke to return the sealing surface 82 into engagement with the second seat piece 74 and thus return the primary poppet 90 to its FIG. 3A position. The decreased volume of internal spaces allow the primary poppet 90 to be reseated even more rapidly than it is unseated.

Figure 3A:
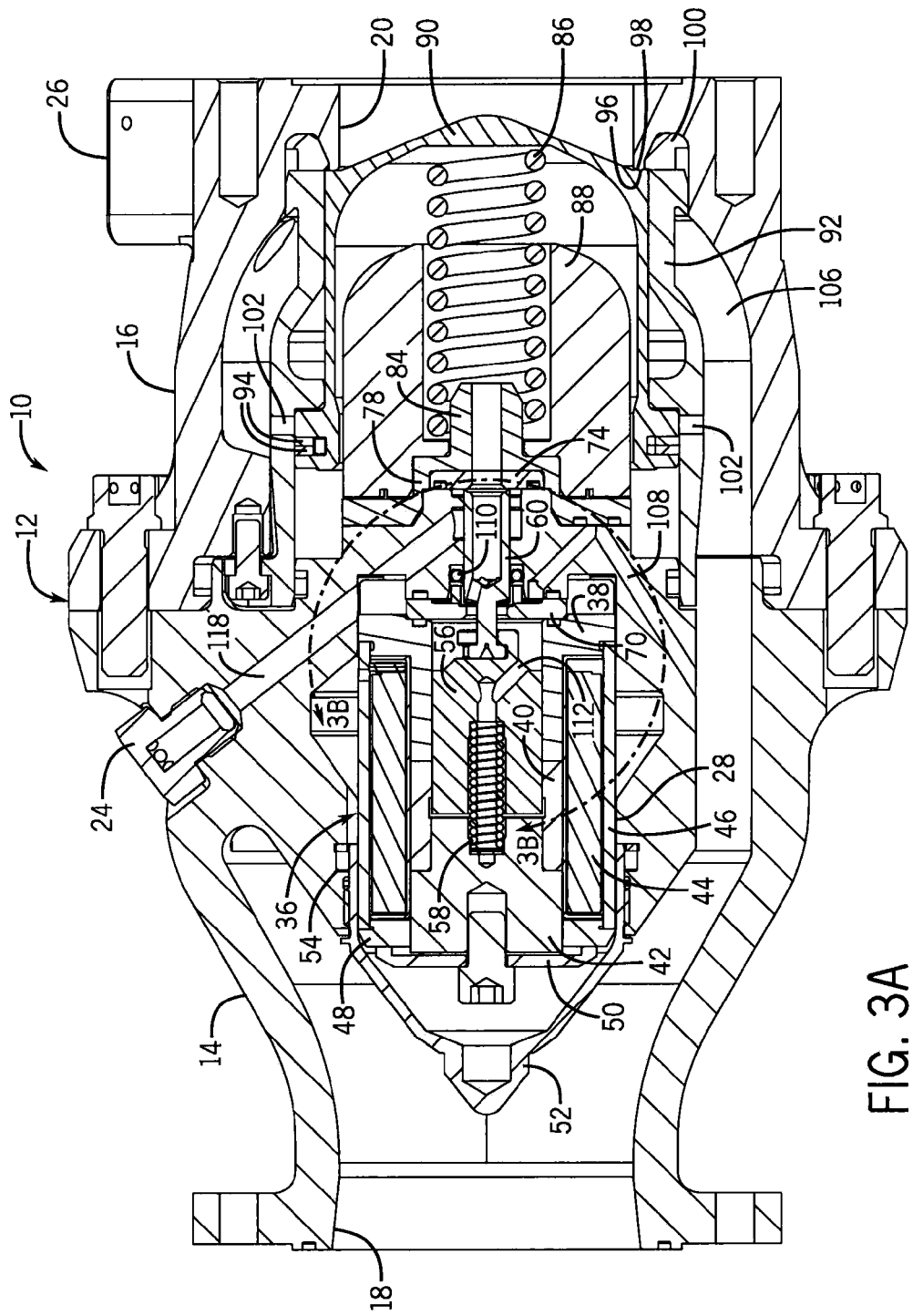
FIG. 3A is a sectional view showing the valve in a normally closed position.
Figure 3B:
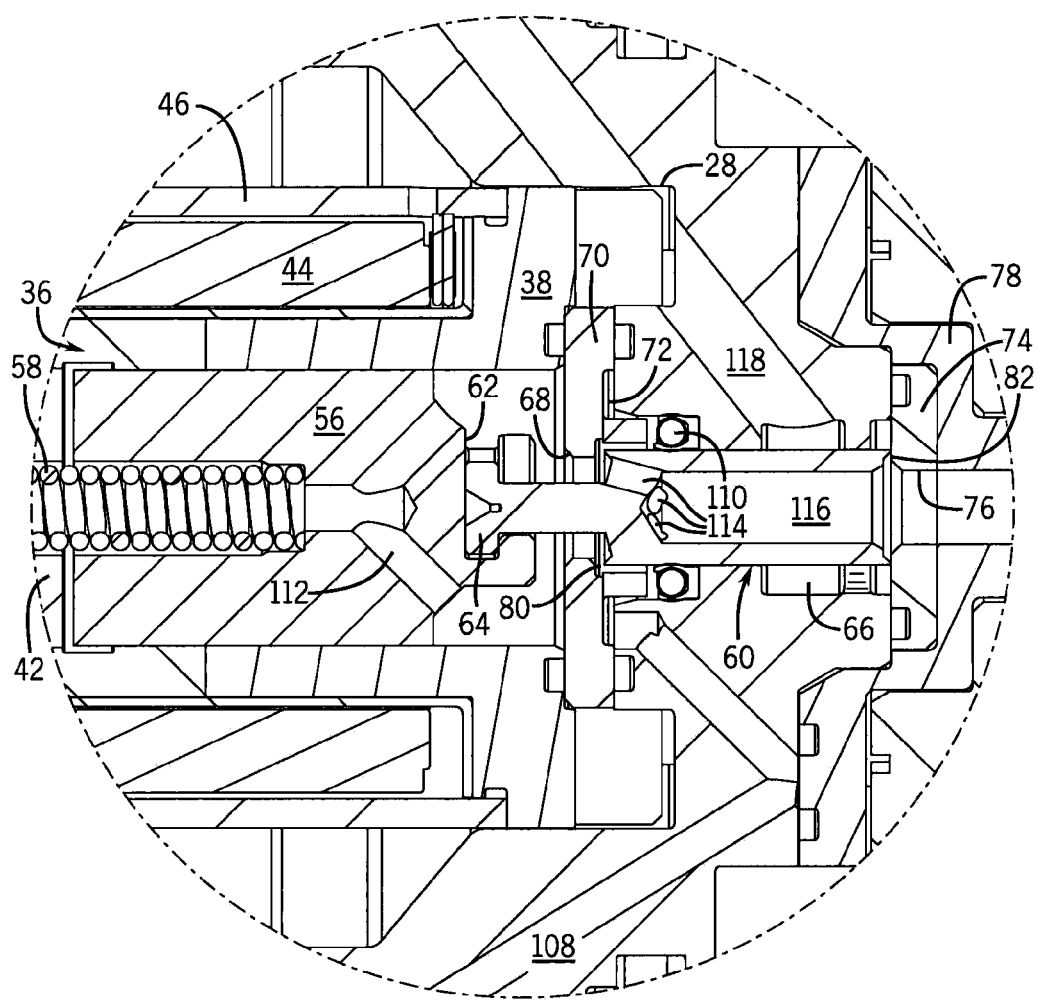
FIG. 3B is an enlarged sectional view taken along arc 3B-3B of FIG. 3A.
Figure 4A:
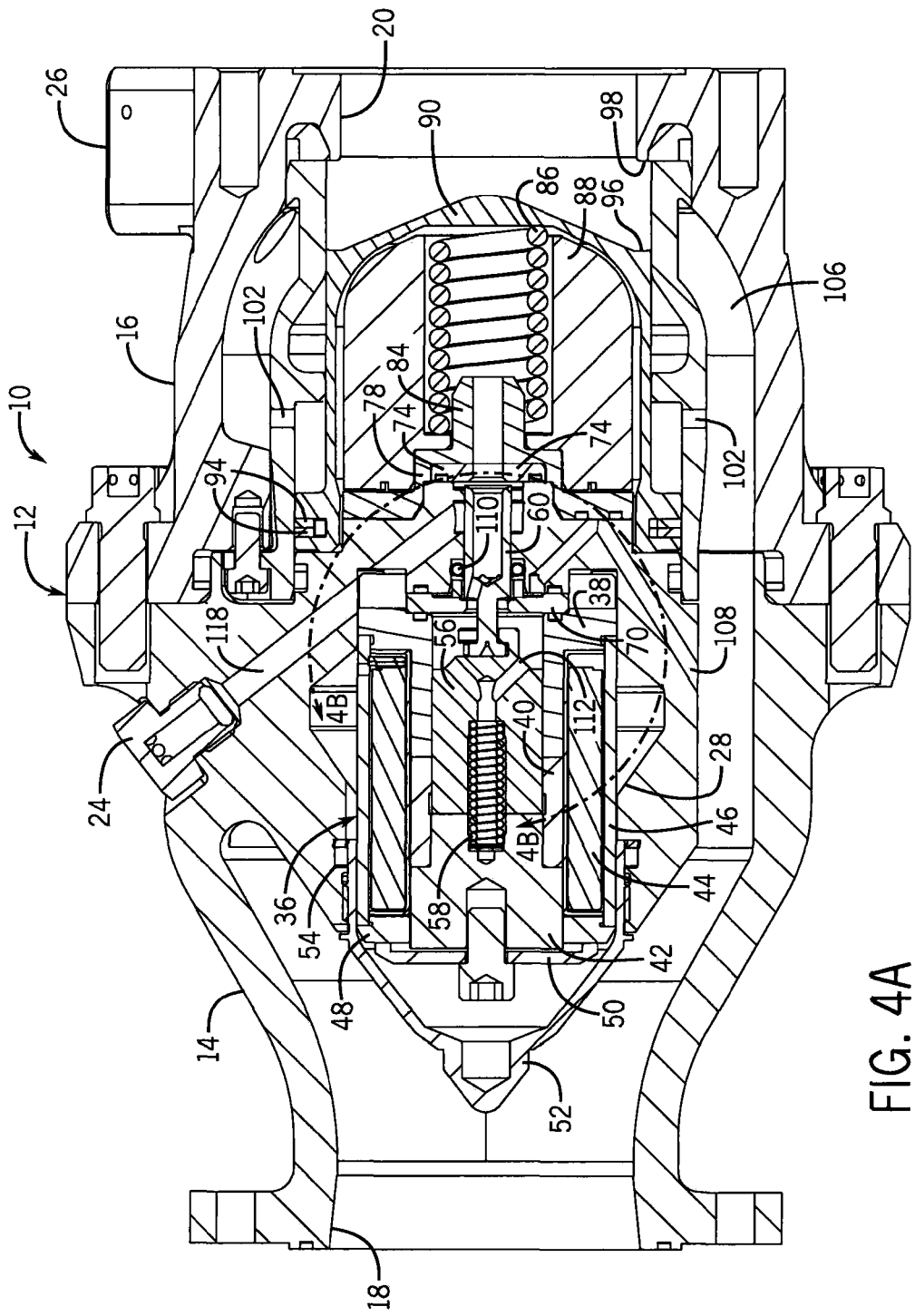
FIG. 4A is a sectional view showing the valve in an open position.
Figure 4B:
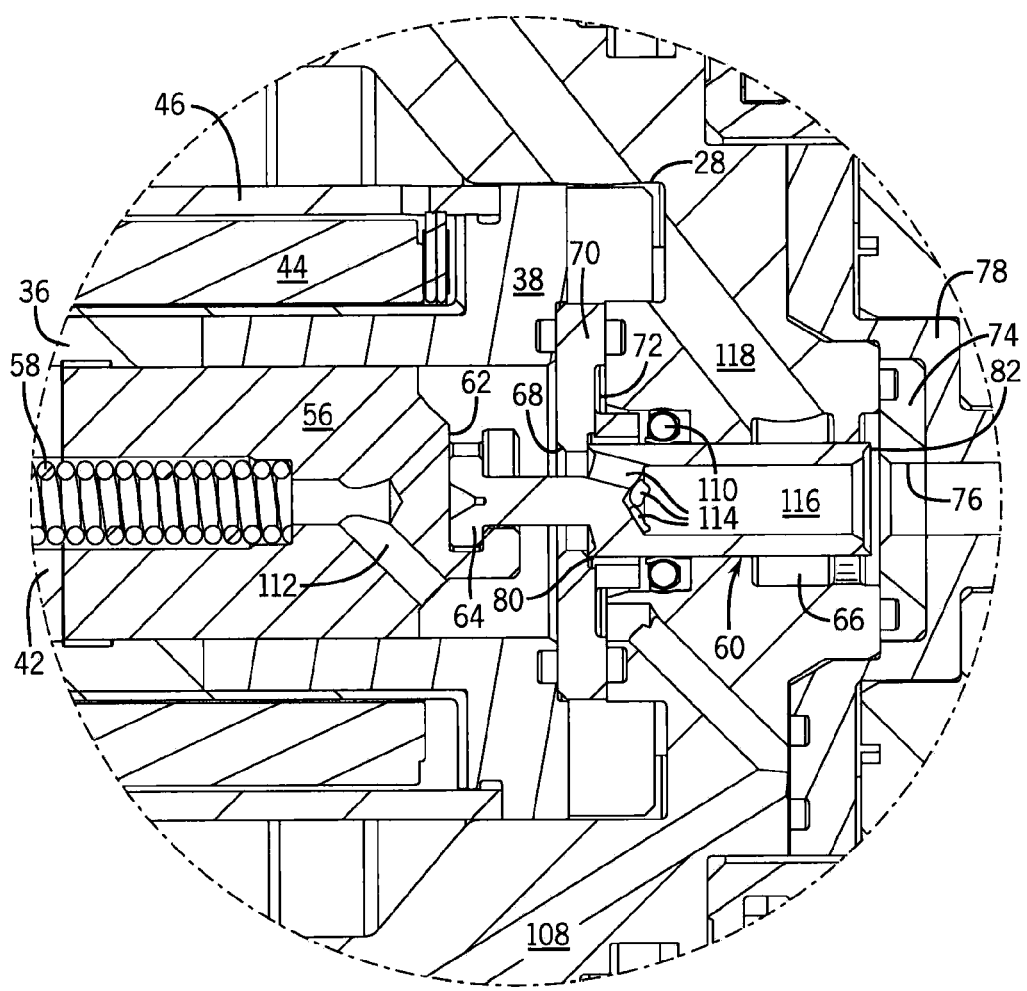
FIG. 4B is an enlarged sectional view taken along arc 4B-4B of FIG. 4A.

The primary poppet 90 can be dampened to prevent damage to the metering edge 96 from such rapid operation. As the primary poppet 90 is closed from the FIG. 4A position to the FIG. 3A position, the seals 94 reduce the annular space between the poppet guide 92 and the body of the primary poppet 90. This space is ultimately allowed to empty through the bleed holes 102 so that the primary poppet 90 can engage the primary seat 98. However, the number, size and location of the bleed holes 102 are selected so that pressure is allowed to rise so as to briefly slow or brake the primary poppet 90 just prior to the metering edge 96 contacting the primary seal 98, but then can quickly dissipate to allow full seating of the primary poppet 90. Locating the small bleed holes just beyond the end of the stroke of the seals 94 as shown in FIG. 3A facilitates such dampening.

By way of example, the above-described construction with the inline, electrically-actuated, pressure-balanced, 3-way pilot poppet 60 which controls pressure to the primary poppet 90 is capable of operating in environments of, and throughputting, very high pressure, such as 3,200 psi or higher of gaseous flow. Furthermore, empirical dynamic analysis indicates that such a construction has an open actuation time of less than 100 ms and a close actuation of time of less than 20 ms. In testing, open times of less than 70 ms and closing times of 12 ms or less have been achieved. Also, in the described construction of the valve 10 the pilot poppet 60 can have a stroke length of less than 0.005 inches, even 0.002 inches or less, with the primary poppet 90 having a stroke several multiples, such as 25-30 times, that of the pilot poppet 60.

It should be appreciated that the above describes only one construction of the flow control valve. Many modifications and variations to the described construction will be apparent to those skilled in the art, which will be within the spirit and scope of the invention. Moreover, as mentioned above, the impulse thruster application is only one of the many uses for the flow control valve and does not limit the bounds of the invention. To ascertain its full scope, the following claims should be referenced.

I claim:
1. A flow control valve, comprising:
a first seat spaced from a second seat, the first and second seats having openings therethrough;
a pilot poppet disposed between the first and second seats and movable along an axis, the pilot poppet having first and second sealing surfaces which alternatively seal against the respective first and second seats;

a primary poppet having a sealing surface to seal against a primary seat, the primary poppet sealing against the primary seat when the pilot poppet is sealed against the first seat and the primary poppet being unseated when the pilot poppet is sealed against the second seat;

a pressure passage between the first and second seats in communication with an inlet of the valve, the pressure passage being in communication with the first and second seat openings when the pilot poppet is sealed against the first seat and blocked from the first and second seat openings when the pilot poppet is sealed against the second seat; and a vent passage between the first and second seats in communication with a low pressure area, the vent passage being blocked from the first and second seat openings when the pilot poppet is sealed against the first seat and in communication with the first and second seat openings when the pilot poppet is sealed against the second seat.

2. The valve of claim 1, wherein the pilot poppet has at least one internal passage that opens to ends of the pilot poppet having the first and second sealing surfaces.

3. The valve of claim 2, further comprising a poppet seal spaced axially between the first and second seats for sealing with an outer surface of the pilot poppet between the first and second sealing surfaces, wherein the poppet seal seals the vent passage from the pressure passage when the pilot poppet is unseated from the first and second seats.

4. The valve of claim 1, wherein the primary poppet includes a cup defining an enclosed internal volume in communication with the pressure passage when the pilot poppet is sealed against the first seat and in communication with the vent passage when the pilot poppet is sealed against the second seat.

5. The valve of claim 4, wherein the primary poppet has a grooved flange containing one or more seal rings.

6. The valve of claim 4, further comprising a spring disposed within the internal volume of the primary poppet.

7. The valve of claim 4, further comprising a volume compensator disposed within the internal volume of the primary poppet.

8. The valve of claim 1, further comprising an electronic actuator for moving the pilot poppet in response to an input drive signal.

9. The valve of claim 8, wherein the actuator includes an electromagnet with a movable armature disposed with an armature cavity in communication with the opening in the second seat such that the armature cavity is in communication with the pressure passage when the pilot poppet is sealed against the first seat and is in communication with the vent passage when the pilot poppet is sealed against the second seat.

10. The valve of claim 9, wherein the armature includes at least one internal passage extending between opposite ends thereof.

11. The valve of claim 9, wherein the armature is directly connected to the pilot poppet via a bayonet connection.

12. The valve of claim 10, further including a spring disposed within the armature cavity.

13. The valve of claim 1, wherein the pilot poppet has a stroke length of less than 0.005 inch.

14. The valve of claim 1, wherein the pilot poppet has an open actuation time of less than 100 ms and a close actuation time of less than 20 ms.

15. An impulse thrust valve, comprising:

a pilot valve arrangement having an electromagnetic actuator for positioning a pilot poppet with respect to first and second seats that are spaced apart along an axis, wherein when the pilot poppet is sealed against the first seat a pressure passage of the valve is in communication with openings of the first and second seats and a vent passage of the valve is blocked from the first and second seat openings, and when the pilot poppet is sealed against the second seat the pressure passage is blocked from the first and second seat openings and the vent passage is in communication with the first and second seat openings; and a primary valve arrangement having a primary poppet sealing against a primary seat, the primary poppet sealing against the primary seat when the pilot poppet is sealed against the first seat and the primary poppet being unseated when the pilot poppet is sealed against the second seat.

16. The valve of claim 15, wherein the pilot poppet has at least one internal passage that opens to ends of the pilot poppet having the first and second sealing surfaces.

17. The valve of claim 16, further comprising a poppet seal spaced axially between the first and second seats for sealing with an outer surface of the pilot poppet between the first and second sealing surfaces, wherein the poppet seal seals the vent passage from the pressure passage when the pilot poppet is unseated from the first and second seats.

18. The valve of claim 15, wherein the primary poppet includes a cup defining an enclosed internal volume in communication with the pressure passage when the pilot poppet is sealed against the first seat and in communication with the vent passage when the pilot poppet is sealed against the second seat.

19. The valve of claim 15, wherein the actuator has a movable armature disposed with an armature cavity in communication with the opening in the second seat such that the armature cavity is in communication with the pressure passage when the pilot poppet is sealed against the first seat and is in communication with the vent passage when the pilot poppet is sealed against the second seat.

20. The valve of claim 19, wherein the armature is directly connected to the pilot poppet via a bayonet connection.

* * * * *